Nov. 10, 1970     G. R. BROUSSARD     3,539,247
DENTAL MIRROR
Filed Aug. 2, 1967
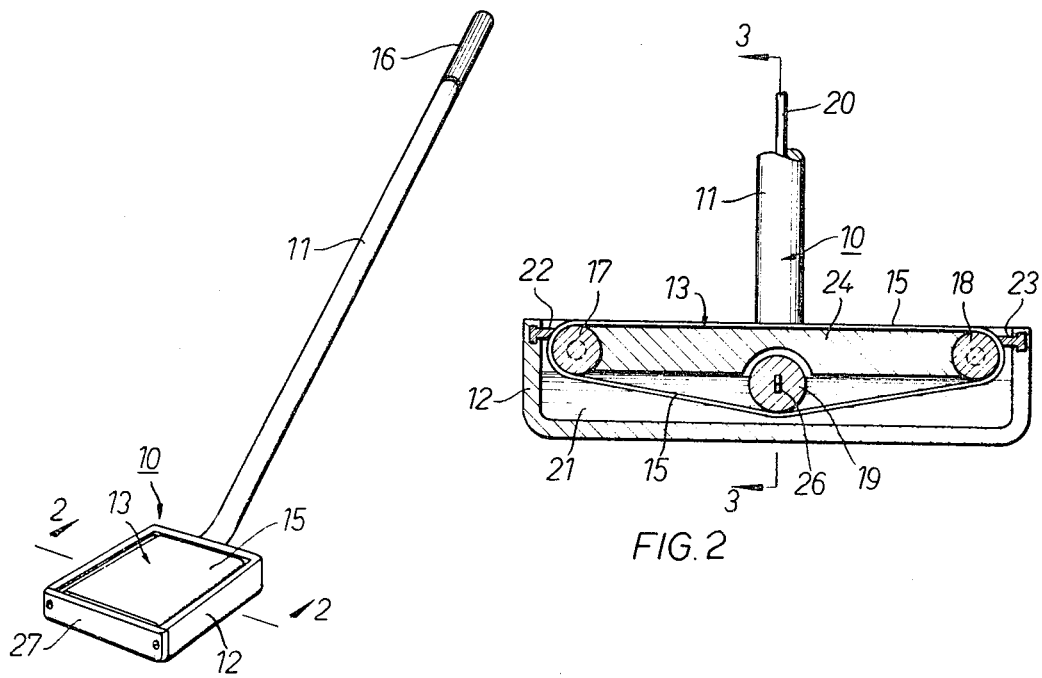
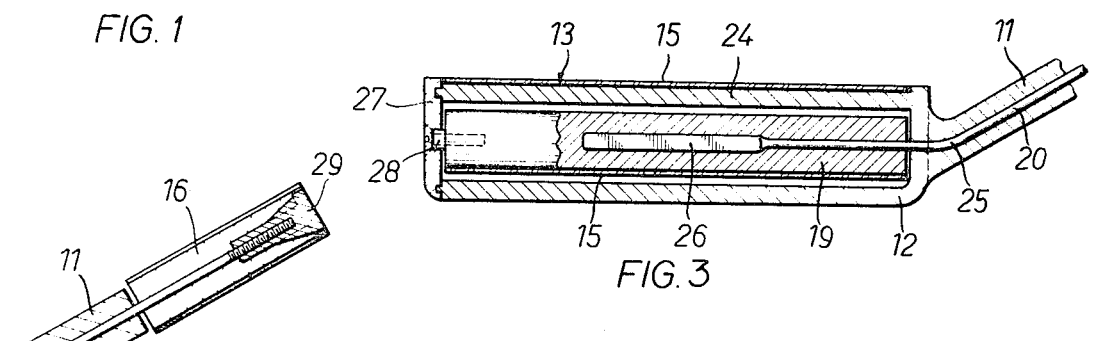
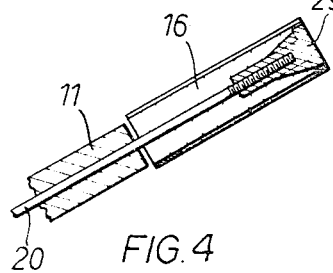
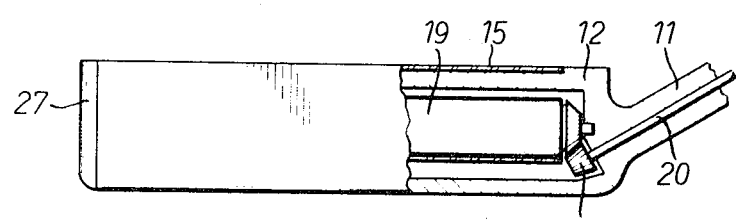
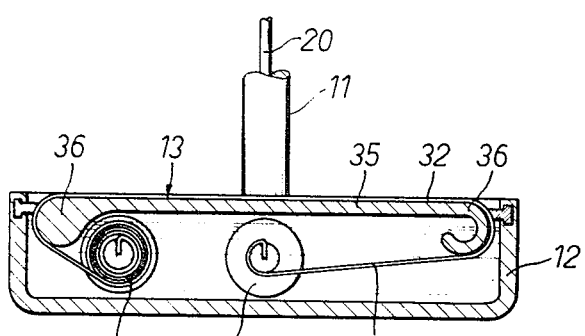
INVENTOR
Gerald R. Broussard
BY John D. Graham
ATTORNEY United States Patent Office 3,539,247
Patented Nov. 10, 1970

3,539,247
DENTAL MIRROR
Gerald R. Broussard, 1325 Glen Cove,
Richardson, Tex. 75080
Filed Aug. 2, 1967, Ser. No. 657,920
Int. Cl. G02b 5/08
U.S. Cl. 350—308                                11 Claims

ABSTRACT OF THE DISCLOSURE

This application discloses a mirror of the hand-held type used by dentists, the reflecting surface of the mirror including a film which may be moved across the surface for renewing the reflecting qualities. The film may be transparent and overlie a reflective backing, or may be itself reflective, and is either a continuous belt or a tape reeled from supply to take up reels. The housing of the mirror contains a cleaning and wetting agent in which the film is immersed prior to moving into place on the reflecting surface, this agent being effective in preventing fogging.

---

The small hand-held mirrors used by dentists present considerable difficulty in that the reflecting surface becomes fogged due to moisture in the mouth, or the surface becomes non-reflective due to debris from drilling operations, etc. For these reasons, the mirror must be either replaced frequently or wiped clean by the dentist while performing an operation in the patient's mouth. This either necessitates a supply of sterilized mirrors available close at hand for the dentist, or requires the dentist to expend considerable portions of his working time in merely cleaning the mirror. Several attempts at providing self-cleaning mirrors have been made wherein mechanical wipers have been devised for use on dental mirrors. These have been unsuccessful in that the devices are complex and awkward to handle, and even so have not provided a solution to the problem of fogging due to vapors.

It is therefore the principal object of this invention to provide a dental mirror wherein the reflecting surface may be quickly and easily restored to highly reflective qualities without requiring removal of the mirror from the patient's mouth for replacement or cleaning. Another object is to provide a dental mirror having a reflective surface which may be coated with an agent which prevents fogging and wherein this coating may be quickly and easily renewed.

In accordance with the invention, a dental mirror is provided having a moveable film on the reflecting surface, the film being a continuous belt or a tape which is shifted across the surface to provide a renewed area of highly reflective properties. The film is preferably immersed in a wetting agent in the housing of the mirror so that when it is shifted into place at the reflecting surface it is coated with this agent to prevent fogging, the wetting agent also functioning to clean the film. The film is moveable by a drive roller which is rotated by a knob on the handle of the mirror in a position easily operated by the dentist.

The novel features believed characteristic of the invention are set forth in the appended claims. The invention itself, however, as well as further objects and advantages thereto, may best be understood by reference to the following detailed description of particular embodiments, when read in conjunction with the accompanying drawings, wherein:

FIG. 1 is a pictorial view of a dental mirror in accordance with this invention;

FIG. 2 is an elevation view in section of the dental mirror of FIG. 1, taken along the line 2—2 in FIG. 1;

FIG. 3 is an elevation view in section of the dental mirror of FIGS. 1 and 2, taken along the line 3—3 in FIG. 2;

FIG. 4 is a detailed sectional view of the end of the handle of the mirror of FIG. 1;

FIG. 5 is an elevation view, partly in section, similar to the view of FIG. 3, of another embodiment of a dental mirror in accordance with this invention; and FIG. 6 is an elevation view in section of a dental mirror in accordance with another embodiment of the invention, this view being similar to that of FIG. 2.

With reference to FIG. 1 of the drawings, a dental mirror 10 utilizing the principles of this invention is illustrated, this mirror 10 including an elongated handle 11 and a body portion 12 having a reflective surface 13. The reflective surface includes a belt or film 15 which may be changed to clean the reflective surface or to provide a fresh reflecting surface which is coated with a wetting agent to avoid fogging. A fresh or renewed portion of the film 15 is rolled into place by turning an end portion 16 of the handle 11. It will be noted that the end portion 16 may be turned by the dentist with thumb and forefinger without changing hands or removing the mirror from the patient's mouth.

Referring now to FIG. 2, a preferred embodiment of the invention is illustrated wherein the film 15 is in the form of a continuous belt which is threaded around a pair of idler rollers 17 and 18 and a drive roller 19. The drive roller 19 engages the belt such that when this roller is rotated, the belt or film 15 will move across the reflecting surface 13 to change the exposed part of the belt. The roller 19 may be composed of a material, or have a surface which will assure engagement with the belt for a minimum of slippage. The drive roller 19 is turned by means including a shaft or cable 20 connected to the roller and extending through the length of the handle 11 to engage the end portion 16, as will be described below. The structural part of the body portion 12 and handle 11 may be comprised of stainless steel or other metal, or of a plastic material.

The body portion 12 of the mirror contains a quantity of a liquid wetting agent 21 whereby the belt 15 is immersed in the wetting agent as it is threaded or rolled through the unit. Sealing strips or squeegee members 22 and 23 mounted in the body portion 12 bear upon the belt 15 against the idle rollers 17 and 18 to provide the function of preventing the loss of the wetting agent 21, aiding in cleaning the belt 15, and removing most of the liquid wetting agent from the film as it is rolled onto the reflecting surface 13. It is noted that the belt 15 is continuous and may be moved in either direction so that the dentist may rotate the end portion 16 in either direction, thus can hold the mirror in either hand.

The reflecting surface 13 includes a backing plate 24 which may be formed integrally with the body portion 12 of the mirror. The backing plate 24 functions as a firm, flat, even support for the film or belt 15. The film or belt 15 may be itself reflective to produce the reflecting surface, or alternatively, the belt 15 may be transparent so that the backing plate 24 is the reflecting surface. In the latter situation, the upper surface of the backing plate 24 would be finished to provide a highly polished reflective surface. If the belt 15 is itself reflective, it may be composed of a Mylar film which is silvered, or may be a thin polished metal strip.

Referring now to FIG. 3, the mechanism for connecting the cable or shaft 20 to the drive roller 19 is illustrated. In this embodiment, the shaft 20 is a flexible cable composed of metal wire or a plastic. This cable is adapted to flex freely at a corner portion 25 at the juncture of the handle 11 and the body portion 12. The inner end of cable 20 is flattened to provide a key 26 which is molded into the drive roller 19 whereby the cable will securely engage the drive roller. Here the cable 20 itself provides one bearing support for the drive roller 19.

Also seen in FIG. 3 is a front plate 27 which is removable for inserting or changing the belt 15 and for filling the unit with the wetting agent 21 or replenishing the wetting agent. A bearing 28 for the drive roller 19 rides in a small aperture in the front plate 27. The front plate 27 may be held in place by a pair of screws or similar fastening means. It is noted that when the front plate 27 is removed, the front bearing member 28 for the drive roller 19 is free and the drive roller 19 may move upward slightly to facilitate removal of the old belt 15 and insertion of a new belt. Then when the front plate 27 is fitted into place, the drive roller 19 is forced tightly against the belt 15.

The end portion 16 of the handle 11 which functions to operate the drive roller 19 is illustrated in FIG. 4. The shaft or cable 20 which extends through the handle 11 is secured to the rotating portion or knob 16 with a suitable fitting 29. The fitting 29 is keyed to assure that the shaft 20 rotates with the end portion 16.

Instead of utilizing the flexible shaft for coupling the rotating knob 16 with the drive roller 19, a gear arrangement may be utilized as seen in the sectional view of FIG. 5. In this embodiment the handle 11, the body portion 12, and the belt 15 are the same as in the previous embodiment, the outward appearance of the unit being the same as that of FIG. 1. However, in this case the drive roller 19 has a beveled gear at its inner end matched with a beveled gear 30 on the lower end of the shaft 20. If desired, the shaft 20 may slide axially a slight distance so that the beveled gear 30 will not engage the gear on the drive roller 19 until the end portion 16 of the handle is pushed in slightly.

Turning now to FIG. 6, an embodiment of the invention is illustrated wherein a wind-up spool arrangement for the belt is utilized in place of an endless belt. The outward appearance of this embodiment would be the same as that of FIG. 1, and the unit would include a handle 11, a body portion 12, and a flexible or geared shaft 20 extending from the knob 16 to the drive roller. A long strip of the transparent or reflective film 32 is used which may be moved across the reflecting surface 13 by winding the tape off of a supply reel 33 to a take-up spool 34. The take-up spool 34 is driven by rotating the shaft 20 in the handle 11 in the same manner as operation of the drive roller 19 in the previous embodiments. The embodiment of FIG. 6 includes a backing plate 35 functioning the same as the backing plate 24 of FIGS. 2 and 3, but differing in that in place of idle rollers 17 and 18 the ends 36 are rounded and smooth so that the tape or belt 32 slides freely over these ends. While additional friction may be introduced, this embodiment simplifies the sealing of the unit to prevent loss of the fluid 21. It is understood that the embodiment of FIG. 2 may utilize this same construction of smooth rounded corners 36 rather than the idle rollers 17 and 18. Sealing strips are included as before, and it is understood that the unit would be filled with a wetting agent as above. In the operation of the unit of FIG. 6, a fresh portion of the film 32 is moved into place on the reflecting surface 13 by reeling a portion of the tape onto the take-up spool 34, it being supplied from the reel 33. When the entire length of tape has been used up, an end plate 27 would be removed as before and the used tape removed so that a fresh supply reel could be inserted through to the take-up reel. Just as above, the film 32 may be transparent with the backing plate 35 being the mirror surface, or the tape 32 may be itself reflective.

While the invention has been described with reference to particular embodiments, it is understood, of course, that this description is not to be construed in a limiting sense. Various modifications of the disclosed embodiments, as well as other embodiments of the invention, will be apparent to persons skilled in the art upon reference to the specification. It is therefore contemplated that the appended claims will cover any such modifications or embodiments as fall within the true scope of the invention.

What is claimed is:

1. A mirror device including a housing containing a reservoir of cleaning fluid, a reflecting surface, a substantially transparent, elongated strip movable across the reflecting surface, means engaging the strip for moving successive portions of the strip onto engagement with the reflecting surface so as to present a portion of the strip over the reflecting surface while other portions of the strip pass through the reservoir of fluid.

2. A mirror device according to claim 1 wherein the reflecting surface is at one face of the housing and an elongated handle extends from said housing, the elongated strip moveable wholly within the housing.

3. A mirror device according to claim 1 wherein the strip is moveable by means of a rotatable knob on said handle, the knob being coupled through the handle and housing to the said means engaging the strip.

4. A mirror device according to claim 1 wherein the strip is immersed in a fluid in said housing before moving onto said surface, the fluid being adapted to clean such strip and prevent fogging thereof.

5. A mirror device according to claim 2 wherein the elongated strip is a continuous belt adapted to be moved across such surface by rotation of a drive roller.

6. A mirror device according to claim 2 wherein the elongated strip is a tape moveable from a supply reel in said housing across said surface to a take-up reel.

7. A mirror device according to claim 5 wherein the drive roller is rotated by means including a flexible shaft engaging the roller and extending through the handle to a manually operable knob on the handle.

8. A mirror device according to claim 5 wherein the take-up reel is rotated by gear means engaging a shaft extending through the handle and adapted to be turned by a manually operable knob on the handle.

9. A mirror device according to claim 2 wherein the housing and the elongated handle are of such size and shape that the mirror device is a small, hand-held unit suitable for use in dental work.

10. A mirror device according to claim 4 wherein squeegee means engages the strip before moving onto said surface.

11. A mirror device including a backing surface, a reflective elongated film moveable across the backing surface, a housing with means therein to contain fluid, the backing surface generally forming one face of the housing, means engaging the film for moving successive portions of the film over the backing surface while other portions of the film are contacted by the fluid within the housing for improving the reflecting quality of the mirror device, an elongated handle fixed to the housing, the housing and handle being of such size and shape that the mirror device is a small, hand-held unit.

References Cited

UNITED STATES PATENTS

| | | | |
|---|---|---|---|
| 292,132 | 1/1884 | Musgrove | 40—86 |
| 1,859,682 | 5/1932 | Ranstead | 350—308 |
| 2,824,396 | 2/1958 | Thomas | 350—315 |
| 3,091,034 | 5/1963 | Piscitelli | 32—69 |
| 3,151,395 | 10/1964 | Moniot | 32—69 |

FOREIGN PATENTS 1,054,676   1959   Germany.

DAVID SCHONBERG, Primary Examiner

M. J. TAKAR, Assistant Examiner

U.S. Cl. X.R.

350—63; 32—69